(12) United States Patent
Carter et al.

(10) Patent No.: US 8,930,589 B2
(45) Date of Patent: *Jan. 6, 2015

(54) SYSTEM, METHOD AND COMPUTER PROGRAM PRODUCT FOR MONITORING MEMORY ACCESS

(75) Inventors: John B. Carter, Austin, TX (US); Karthick Rajamani, Austin, TX (US); Gregory S. Still, Raleigh, NC (US); Jeffrey A. Stuecheli, Austin, TX (US); Malcom S. Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 213 days.

This patent is subject to a terminal disclaimer.

(21) Appl. No.: 12/869,535

(22) Filed: Aug. 26, 2010

(65) Prior Publication Data

US 2012/0054374 A1   Mar. 1, 2012

(51) Int. Cl.
*G06F 3/00*    (2006.01)
*G06F 11/34*   (2006.01)

(52) U.S. Cl.
CPC ........ *G06F 11/3442* (2013.01); *G06F 11/3476* (2013.01); *G06F 2201/88* (2013.01); *G06F 2201/885* (2013.01)
USPC ........................................... 710/18; 711/133

(58) Field of Classification Search
USPC ........................................... 710/18; 711/133
See application file for complete search history.

(56) References Cited

U.S. PATENT DOCUMENTS

| | | | |
|---|---|---|---|
| 6,026,464 A * | 2/2000 | Cohen | 711/5 |
| 6,073,225 A * | 6/2000 | James et al. | 711/202 |
| 6,088,766 A * | 7/2000 | Bachmat et al. | 711/114 |
| 6,298,070 B1 | 10/2001 | Carlson et al. | |
| 6,369,728 B1 * | 4/2002 | Tng et al. | 341/139 |
| 6,701,412 B1 | 3/2004 | McDougall et al. | |
| 6,988,054 B2 * | 1/2006 | Giffords | 702/186 |
| 7,062,094 B2 * | 6/2006 | Zhou et al. | 382/232 |
| 7,177,853 B1 | 2/2007 | Ezra et al. | |
| 7,281,105 B1 * | 10/2007 | Wang et al. | 711/165 |
| 7,310,309 B1 | 12/2007 | Xu | |
| 7,404,047 B2 | 7/2008 | Dodd et al. | |
| 7,412,369 B1 | 8/2008 | Gupta | |
| 7,412,492 B1 | 8/2008 | Waldspurger | |
| 7,707,379 B2 | 4/2010 | Bartley et al. | |
| 7,724,662 B2 | 5/2010 | Xu | |

(Continued)

FOREIGN PATENT DOCUMENTS

WO     9941668     8/1999

OTHER PUBLICATIONS

Ben Verghese, Operating System Support for Improving Data Locality on CC-NUMA Compute Servers, 1996, ACM, pp. 279.*

(Continued)

*Primary Examiner* — Elias Mamo
(74) *Attorney, Agent, or Firm* — James L. Baudino

(57) ABSTRACT

According to one aspect of the present disclosure a method and technique for monitoring memory access is disclosed. The method includes monitoring access to a memory unit, updating an activity cache associated with an incrementor with access data corresponding to accesses to the memory unit, monitoring a rate of access to the memory unit, adjusting a sample rate of the access data for storage in the memory unit based on the rate of access, and scaling a value of the access data based on the sample rate.

26 Claims, 3 Drawing Sheets

(56) References Cited

U.S. PATENT DOCUMENTS

| | | |
|---|---|---|
| 2009/0276600 A1 | 11/2009 | Wallman |
| 2010/0077168 A1 | 3/2010 | Arakawa |
| 2010/0235599 A1* | 9/2010 | Akagawa et al. ............. 711/163 |
| 2011/0113202 A1* | 5/2011 | Branover et al. ............. 711/135 |
| 2012/0041914 A1* | 2/2012 | Tirunagari ..................... 706/15 |

OTHER PUBLICATIONS

Simon Kahan et al., "MAMA!" A Memory Allocator for Multithreaded Architectures, Proceedings of the eleventh ACM SIGPLAN symposium on Principles and practice of parallel programming, 2006, pp. 178-186, New York, NY USA.

Verghese-et al.; Operating System for Improving Data Locality on CC-NUMA Compute Servers; INSPEC/ACM; 1996.

Lu-et al.; "Design and Implementation of a Lightweight Dynamic Optimization System"; Google; 2004.

VMware; Understanding Memory Resource Management in VMware ESX 4.1; Google; 2005.

Saum-et al.; "Inverted List Kinetic Monte Carlo with Rejection Applied to Directed Self-Assembly of Epitaxial Growth"; Google; 2009.

* cited by examiner

SYSTEM, METHOD AND COMPUTER PROGRAM PRODUCT FOR MONITORING MEMORY ACCESS

BACKGROUND

In computer systems, memory storage represents a significant portion of the cost of the computer system. Thus, constraints such as cost, space/size and speed are used to evaluate and optimize utilization of memory storage. Further, memory storage is generally a shared resource. For example, computer systems may include many processors and input/output (I/O) devices. Allocation of the memory storage between different programs and/or applications as they are invoked and/or executed may be monitored to better utilize memory usage. For example, measurement devices, sometimes called accumulators, may be used to gather statistics on what device is accessing memory and/or the rate of access.

BRIEF SUMMARY

According to one aspect of the present disclosure a method and technique for monitoring memory access is disclosed. The method includes monitoring access to a memory unit, updating an activity cache associated with an incrementor with access data corresponding to accesses to the memory unit, monitoring a rate of access to the memory unit, adjusting a sample rate of the access data for storage in the memory unit based on the rate of access, and scaling a value of the access data based on the sample rate.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
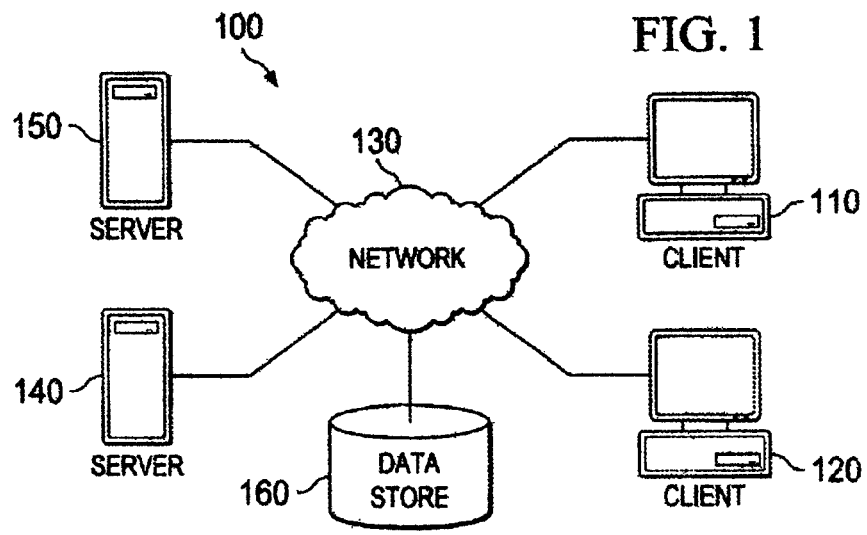
FIG. 1 is an embodiment of a network of data processing systems in which the illustrative embodiments of the present disclosure may be implemented.

Embodiments of the present disclosure provide a method, system and computer program product for monitoring memory access. For example, in some embodiments, the bandwidth utilized to monitor and store information in memory corresponding to accesses or references to the memory is reduced. In some embodiments, the bandwidth utilized to access the memory to store the access information is reduced by employing a dynamic sampling method to automatically vary a sample rate and corresponding value scaling of the access information based on the rate of memory access. Further, in some embodiments, an activity cache is utilized in connection with incremented access information such that, responsive to the access data exceeding a threshold, storage of the access information in memory is made. In further embodiments, the variable sampling and scaling of access information may be performed independently for different memory accessing devices and/or memory addresses.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with and instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
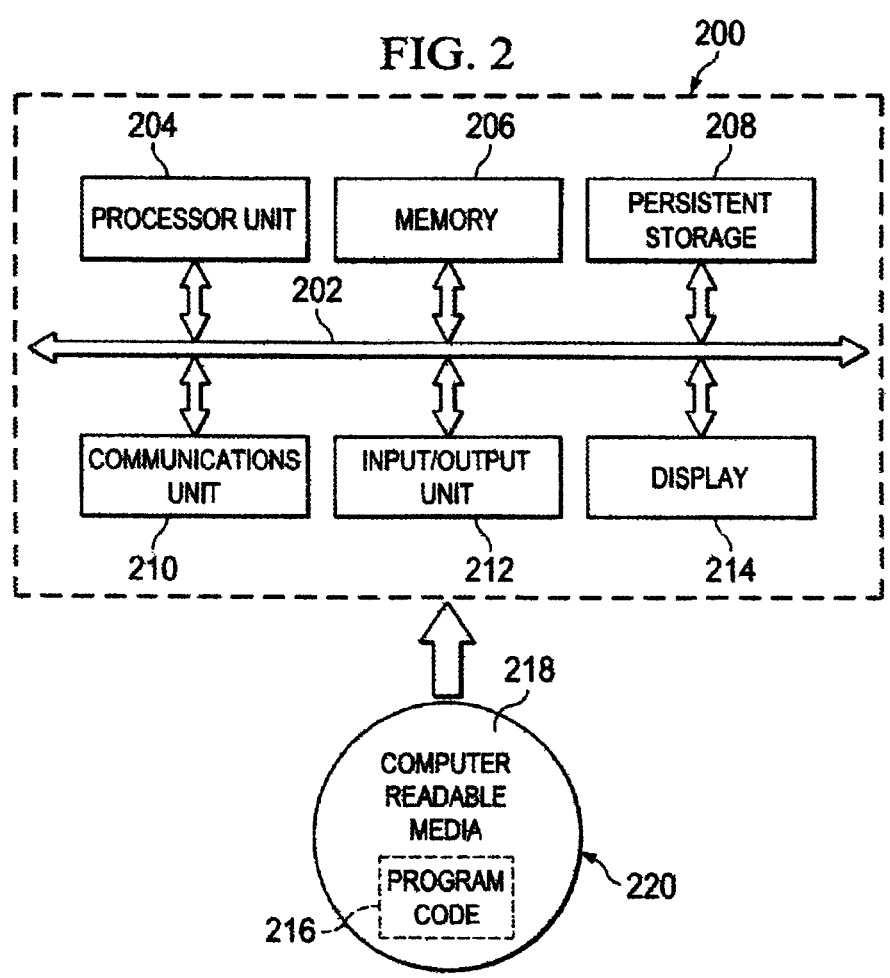
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM System P® servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a data transfer management system according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
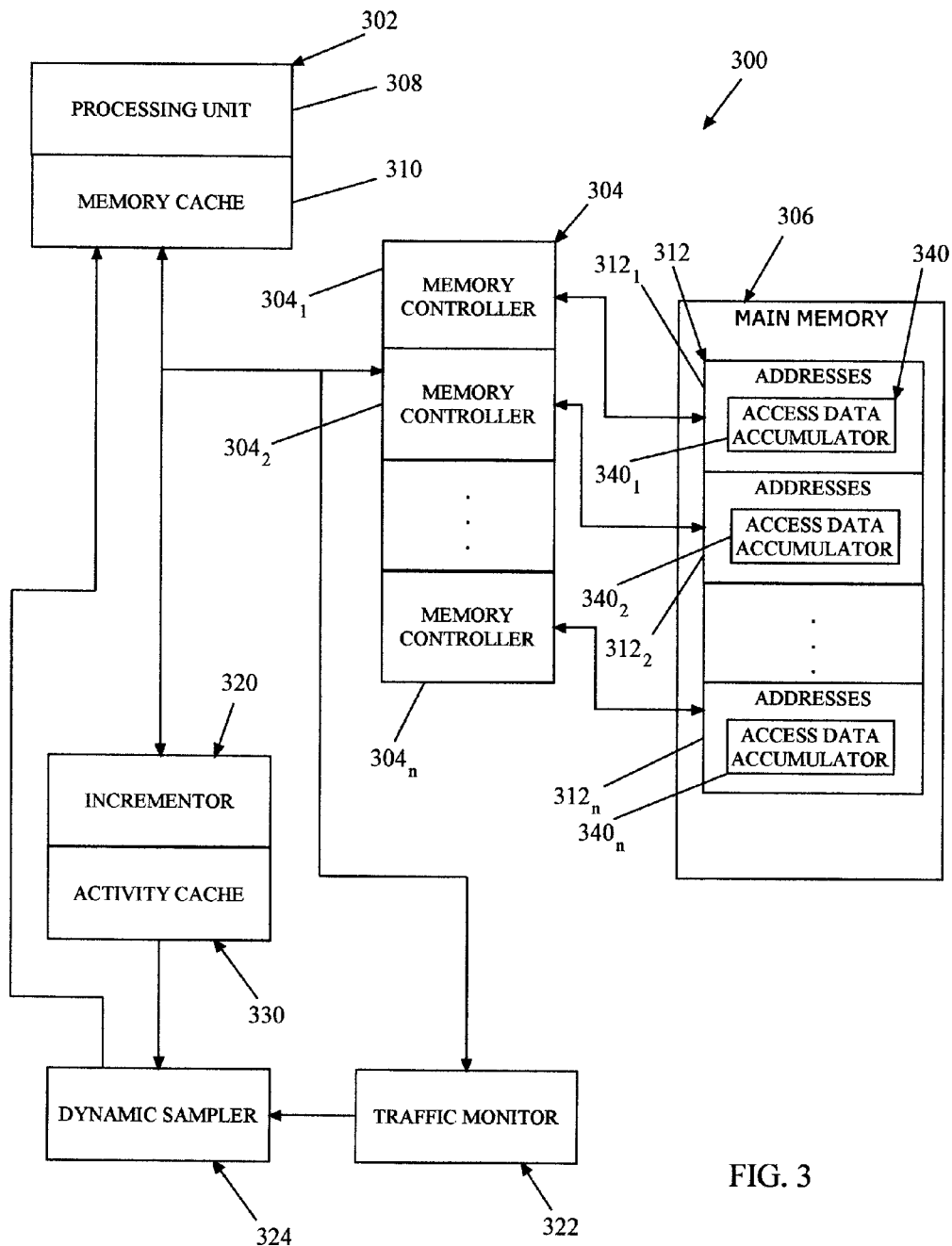
FIG. 3 is a diagram illustrating an embodiment of a data processing system in which illustrative embodiments of a memory access monitoring system may be implemented.

FIG. 3 is an illustrative embodiment of a system 300 for monitoring memory access. System 300 may be implemented on a data processing system or platform such as, but not limited to, servers 140 and/or 150, clients 110 and/or 120, or at other a data processing system locations. In the embodiment illustrated in FIG. 3, system 300 comprises one or more accessors 302, one or more memory controllers 304, and a main memory unit 306. Accessors 302 comprise devices that may access memory unit 306 to perform a particular operation (e.g., load/store data or read data). Accessors 302 may comprise one or more processing units 308 or other types of devices. In the embodiment illustrated in FIG. 3, processing unit 308 has associated therewith a memory cache 310. Memory cache 310 may represent any of a variety of levels of cache memory such as, but not limited to, a last level memory cache. Memory controller(s) 304 is used to control various data read and/or write operations between accessors 302 and memory unit 306. In FIG. 3, multiple memory controllers 304 are shown; however, it should be understood that a greater or fewer quantity of memory controllers 304 may be utilized. In some embodiments, different memory controllers 304 may be associated with managing and/or controlling access to a particular range of memory addresses 312 of memory unit 306. For example, in the illustrated embodiment, memory controllers $304_{1-n}$ may each be associated with respective ranges of memory addresses $312_{1-n}$. Thus, for example, memory controller $304_1$ manages and/or controls operations associated with memory addresses $312_1$, memory controller $304_2$ manages and/or controls operations associated with memory addresses $312_2$, etc. However, it should be understood that in some embodiments, a single memory controller 304 may be associated with an entirety of memory unit 306.

In the embodiment illustrated in FIG. 3, each range of memory addresses 312 has associated therewith and/or therein an access data accumulator 340 for storing access information and/or data relating to memory references. For example, in FIG. 3, each range of memory addresses $312_1$-$312_n$ has associated therewith a respective access data accumulator $340_1$-$340_n$ for storing memory access information relating to each respective range of memory addresses 312. For example, access data accumulator $340_1$ stores memory reference information corresponding to references to the range of memory addresses $312_1$, access data accumulator $340_2$ stores memory reference information corresponding to references to the range of memory addresses $312_2$, etc. However, it should be understood that in some embodiments, a single access data accumulator may be used corresponding to the entirety of memory unit 306, or a single access data accumulator corresponding to different groupings or memory addresses and/or controllers 304.

In FIG. 3, system 300 also comprises at least one incrementor 320, traffic monitor 322 and sampler 324. Each of memory controller 304, incrementor 320, traffic monitor 322 and sampler 324 may comprise hardware, software, firmware, or a combination thereof. For example, each of memory controller 304, incrementor 320, traffic monitor 322 and sampler 324 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In the illustrated embodiment, memory controllers 304 are configured to cause the logging, incrementing and/or updating of access statistics associated with memory unit 306. For example, in the illustrated embodiment, incrementor 320 is configured to be incremented and/or updated to accumulate, gather and/or store access statistics associated with references to memory unit 306. Thus, in response to accessor 302 referencing memory unit 306, memory controller 304 updates various types of access statistics and/or information in connection with such access to memory unit 306. The access statistics or access data may include the total number of accesses to memory unit 306 and a history array of which accessors 302 referenced memory unit 306. It should be understood that other types or access statistics may also be monitored, recorded and/or stored. In some embodiments, each memory controller $304_{1-n}$ updates the access data in response to references to the particular range of addresses $312_{1-n}$ associated with the respective memory controllers $304_{1-n}$. Thus, for example, in response to a reference to one of memory addresses $312_1$, memory controller $304_1$ increments and/or updates the access data collected by incrementor 320 corresponding to such memory unit 306 reference. In the illustrated embodiment, incrementor 320 includes an activity cache 330 temporarily storing the access data corresponding to memory unit 306. Memory controllers 304 and/or incrementor 320 may form part of or be disposed within memory unit 306 or may be located remote from memory unit 306.

Traffic monitor 322 monitors the bandwidth and/or rate of memory unit 306 access. For example, traffic monitor 322 may be disposed along and/or be otherwise connected to a bus associated with accessors 302 referencing memory unit 36 to enable traffic monitor 306 to monitor and/or assess bandwidth utilization in connection with references to memory unit 306.

Sampler 324 is configured to determine and/or otherwise calculate a sample rate for sampling access data based on the bandwidth utilization or rate of memory unit 306 access. For example, the sample rate is used to reduce the number or quantity of data points/elements stored in memory unit 306 corresponding to references to memory unit 306 and/or reduce the frequency that memory unit 306 is accessed for storing access data therein, thereby reducing the bandwidth used to maintain the access data accumulated by incrementor 320 and stored in memory unit 306. Thus, in operation, as the rate of memory unit 306 access increases, the sample rate is used to reduce the quantity of access data elements sent to memory unit 306 to be stored therein. In FIG. 3, the access data accumulated representing references to memory unit 306 is stored in memory unit 306 by access data accumulator 340. In some embodiments, the sample rate determines and/or is otherwise used to indicate the quantity or sample taken from activity cache 330 to represent references to memory unit 306. Thus, the sample rate results in some quantity of access data elements accumulated by incrementor 320 and residing in activity cache 330 to be discarded. Sampler 324 is also configured to scale the remaining access data taken from activity cache 330 to statistically represent the references to memory unit 306 to compensate for the discarded data elements. For example, in some embodiments, a sample rate may be used that randomly discards (N−1)/N of the access data elements, where N represents the quantity of access data elements. The remaining access data elements are scaled by multiplying the effect of the remaining access data elements by N. Accordingly, in one example, the sample rate may be selected such that N equals 10, where nine-tenths of the access data elements are randomly discarded and the remaining access data element values as applicable are multiplied by ten. The access data element value may represent the number of times memory unit 306 has been referenced such that scaling or multiplying the undiscarded data elements based on the sample rate maintains a statistically representative value of the access to memory unit 306. Accordingly, the sample rate is used to reduce the bandwidth used to store the access data in memory unit 306 while the access data 340 stored in memory unit 306 is a statistically representative indication of references to memory unit 306.

In some embodiments, the sample rate may be a static value or may be dynamically adjusted based on the rate of memory unit 306 access. For example, in some embodiments, the sample rate may be a fixed rate/value regardless of the rate of memory unit 306 access such that the sample rate remains constant despite variations in system load. In other embodiments, the sample rate may dynamically vary based on the rate of references to memory unit 306. In a dynamic embodiments, the rate of memory unit 306 access determined by traffic monitor 322 is used to vary the sample rate used by sampler 324 to sample the access data residing in activity cache 330. Thus, as the rate of references to memory unit 306 increases, the sample rate may decrease, thereby resulting in a greater quantity of access data elements being discarded while increasing the scaling or multiplying effect on the remaining access data elements. Correspondingly, as the access rate to memory unit 306 decreases, the sample rate may be dynamically adjusted to increase the sample of access data elements retained and reduce the scaling effect of the samples taken.

Further, in some embodiments, the sample rate may vary based on other factors, such as the accessors 302 referencing memory unit 306 and/or the range of memory addresses 312 being referenced. For example, traffic monitor 322 may be configured to gather information related to the rate of memory unit 306 access by certain accessors 302 and the rate certain ranges of memory addresses 312 are being referenced. Thus, the access rate information obtained by traffic monitor 322 may be used in connection with the accumulated access data to tailor and/or independently adjust a sample rate used by sampler 324 as applied to certain accessors 302 and/or ranges of memory addresses 312. Therefore, for example, if the rate of access to memory unit 306 for a particular accessor 302 increases, the sample rate corresponding to access data elements related to this particular accessor 302 may be adjusted to compensate for the increased rate of access. Accordingly, in some embodiments, the sample rate may be independently adjusted and applied based on the access rate of different accessors 302, the access rate to different ranges of memory addresses 312, or other factors.

In some embodiments, activity cache 330 is used to temporarily store memory unit 306 access data until the level or quantity of access data residing in activity cache 330 reaches or exceeds one or more thresholds, thereby further reducing the bandwidth utilized to store the access data in memory unit 306. For example, in some embodiments, access data residing in activity cache 330 is taken from activity cache 330 and stored in memory unit 306 in response to a certain event, such as the level or quantity of access data residing in activity cache 330 exceeding a threshold, a constant or variable time period, or some other basis. Activity cache 330 also provides a location to store the access data for application of the sample rate before the access data is stored in memory unit 306.

In some embodiments, the sampling and/or scaling of access data updates may be performed as the references to memory unit 306 are generated. For example, in some embodiments, as illustrated in FIG. 3, sample rate information from sampler 324 may be communicated to a memory cache 310 associated with a particular accessor 302 such that the sampling/scaling of the memory unit 306 references are performed as the references are generated, thereby reducing the bandwidth utilized for accumulating the access data. However, it should be understood that the sample rate may be utilized at other locations or be used by other devices in the system 300 as the references to memory unit 306 are generated and/or communicated to reduce the bandwidth associated with accumulating access data statistics. Further, in FIG. 3, a single instance of incrementor 320, activity cache 330, sampler 324 and traffic monitor 322 is illustrated; however, it should be understood that each memory controller $304_1$-$304_n$ may have an instance of incrementor 320, activity cache 330, sampler 324 and traffic monitor 322 associated therewith (e.g., formed as part of a respective memory controller $304_{1\text{-}n}$ and/or disposed entirely or partially remote from memory controller $304_{1\text{-}n}$).

Figure 4:
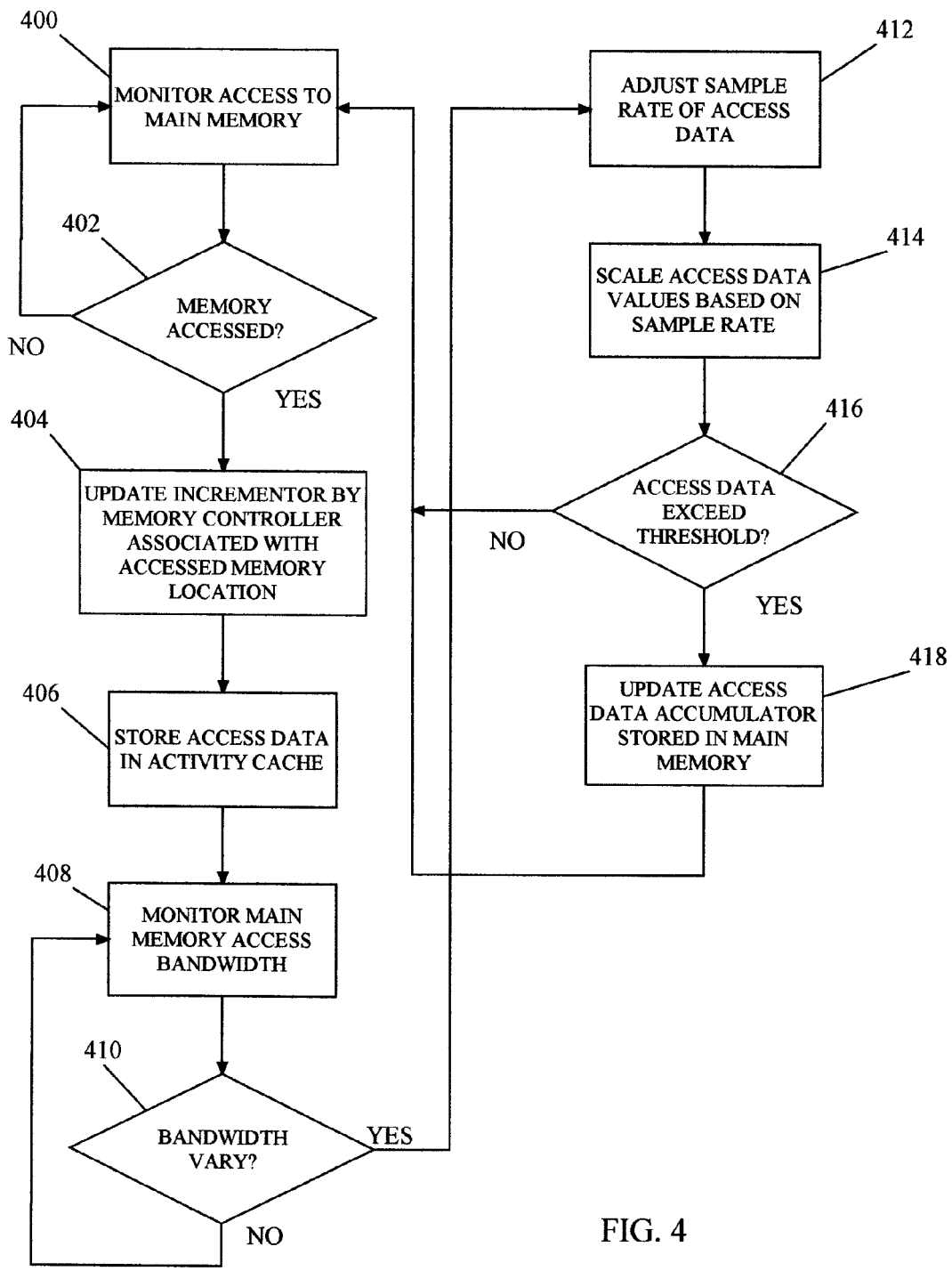
FIG. 4 is a flow diagram illustrating an embodiment of a memory access monitoring method.

FIG. 4 is a flow diagram illustrating an embodiment of a method for monitoring memory access. The method begins at block 400, where memory controller(s) 304 monitors access to memory unit 306. At decisional block 402, a determination is made whether memory unit 306 is accesses/referenced. If not, the method returns to block 400 where memory controller(s) 304 continues to monitor for memory unit 306 references. If so, the method proceeds to block 404, where memory controller(s) 304 update incrementor 320 with the corresponding access data. As discussed above, in some embodiments, different memory controllers 304 are associated with different ranges of memory addresses 312 of memory unit 306. Thus, in some embodiments, particular memory controllers 304 update the accumulated access data based on the particular range of register addresses 312 being referenced.

At block 406, the accumulated access data is stored in activity cache 330 by incrementor 320. At block 408, traffic monitor 322 monitors the bandwidth utilization for memory unit 306 references. At block 410, a determination is made whether bandwidth utilization for memory unit 306 references has varied (e.g., changed from a baseline or previous value). If not, the method returns to block 408, where traffic monitor 322 continues to monitor the rate of access to memory unit 306. If so, the method proceeds to block 412, where sampler 324 utilizes the access rate to calculate and/or otherwise set a sample rate for sampling access data. For example, as the rate of memory unit 306 references increase or decrease, the sample rate may correspondingly vary. The sample rate may be used to sample access data stored in and/or obtained from activity cache 330 and/or utilized at a particular accessor 302 source as the memory unit 306 references are generated.

At block 414, the access data values are scaled based on the sample rate. For example, in some embodiments, the values of the access data samples are scaled to compensate for discarded access data values. At decisional block 416, a determination is made whether the access data stored in activity cache 330 exceeds some threshold such that the access date is transferred to and stored in memory unit 306. If not, the method returns to block 400 where access to memory unit 306 continues to be monitored. If so, the method proceeds to block 418, where the access data accumulated by incrementor 320 is communicated out of activity cache 330 and stored in memory unit 306.

It should be understood that various functions or processes described above may be performed at different times and/or at different locations within system 300. For example, in some embodiments, sampling and/or scaling of access data may be performed as access data is retrieved from out output from activity cache 330. In other embodiments, the sampling and/or scaling of access data may be performed at the accessor 302 or as the updates to the incrementor 320 are generated.

Thus, embodiments of the present disclosure reduce bus or bandwidth traffic to memory for monitoring and/or storing reference statistics associated with memory. The present disclosure enables the reduction in memory access for the monitoring and storage of access statistics using several features, such as sampling and scaling the access statistics data, updating access statistics data corresponding to the memory controller and/or range of memory addresses being referenced, and/or by utilizing an activity cache to temporarily store the access statistics data until a threshold or other variable is met for transferring the statistics data to the memory. Embodiments of the present disclosure also provide a dynamic sampling feature to dynamically respond to variations in workload and/or memory references.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
monitoring access to a memory unit;
updating an activity cache associated with an accumulator with access data corresponding to accesses to the memory unit;
monitoring a rate of access to the memory unit;
adjusting a sample rate for sampling the access data based on the rate of access; and
scaling a value of the access data based on the sample rate.

2. The method of claim 1, wherein adjusting a sample rate comprises discarding at least a portion of the access data.

3. The method of claim 2, wherein scaling comprises scaling a value of a remaining portion of the access data for storage in the memory unit based on the sample rate.

4. The method of claim 1, further comprising, responsive to an amount of access data residing in the activity cache exceeding a threshold, storing the access data in the memory unit.

5. The method of claim 1, wherein monitoring comprises monitoring access to the memory unit for a plurality of different accessors, and wherein adjusting comprises adjusting the sample rate for at least one of the accessors based on the rate of access by the at least one accessor.

6. The method of claim 5, wherein scaling comprises scaling a value of the access data corresponding to the at least one accessor based on the sample rate.

7. The method of claim 1, wherein adjusting the sample rate comprises:
randomly discarding a portion of the access data over a time period; and
scaling a value of a remaining portion of the access data accumulated over the time period for storage in the memory unit.

8. The method of claim 1, further comprising:
   determining the access rate for a plurality of different accessors of the memory unit; and
   independently adjusting the sample rate corresponding to each accessor based on the respective access rates.

9. The method of claim 1, further comprising applying the sample rate to the access data stored in the activity cache.

10. The method of claim 1, further comprising applying the sample rate at an accessor in response to the accessor generating an access to the memory unit.

11. The method of claim 1, further comprising scaling the access data as updates to the access data are generated.

12. A system comprising:
   a memory unit;
   an incrementor having an activity cache associated therewith for storing access data corresponding to accesses to the memory unit;
   a traffic monitor configured to monitor a rate of access to the memory unit for at least one accessor;
   a sampler configured to adjust a sample rate of the access data stored in the activity cache for storage in the memory unit based on the rate of access, the sampler configured to scale the access data based on the sample rate.

13. The system of claim 12, wherein the sampler is configured to independently adjust the sample rate for at least two different accessors.

14. The system of claim 13, wherein the sampler is configured to independently scale the access data corresponding to each of the at least two accessors.

15. The system of claim 12, wherein the sampler is configured to:
   randomly discard a portion of the access data stored in the activity cache over a time period; and
   scale a value of a remaining portion of the access data accumulated over the time period for storage in the memory unit.

16. The system of claim 12, wherein, responsive to an amount of access data residing in the activity cache exceeding a threshold, store the access data in the memory unit.

17. A computer program product for data transfer management, the computer program product comprising:
   a computer readable storage medium having computer readable program code embodied therewith, the computer readable program code comprising computer readable program code configured to:
   monitor access to a memory unit;
   update an activity cache associated with an incrementor with access data corresponding to accesses to the memory unit;
   monitor a rate of access to the memory unit;
   adjust a sample rate of the access data for storage in the memory unit based on the rate of access; and
   scale a value of the access data stored in the memory unit based on the sample rate.

18. The computer program product of claim 17, wherein the computer readable program code is configured to:
   discard at least a portion of the access data obtained from the activity cache; and
   scale a value of a remaining portion of the access data for storage in the memory unit based on the sample rate.

19. The computer program product of claim 17, wherein the computer readable program code is configured to:
   monitor access to the memory unit for a plurality of different accessors; and
   independently adjust the sample rate for the accessors based on the rate of access by the accessor of the memory unit.

20. The computer program product of claim 17, wherein the computer readable program code is configured to, responsive to an amount of access data residing in the activity cache exceeding a threshold, store the access data in the memory unit.

21. A system comprising:
   a memory unit;
   an incrementor having an activity cache associated therewith for storing access data corresponding to accesses to the memory unit;
   a traffic monitor configured to monitor a rate of access to the memory unit;
   a sampler configured to discard a portion of the access data obtained from the activity cache over a time period based on the rate of access, the sampler configured to scale a remaining portion of the access data obtained from the activity cache corresponding to the time period based on the rate of access.

22. The system of claim 21, wherein the traffic monitor is configured to determine a rate of access for each of a plurality of different accessors.

23. The system of claim 22, wherein the sampler is configured to independently adjust the amount of access data discarded and scaled for each of the different accessors based on the respective rates of access.

24. The system of claim 21, wherein, responsive to an amount of access data in the activity cache exceeding a threshold, store the scaled access data in the memory unit.

25. The system of claim 21, wherein the sampler is configured to dynamically vary a sample rate associated with the discarded and the scaled access data based on variations in the rate of access to the memory unit.

26. A method comprising:
   monitoring access to a memory unit;
   determining a number of accesses to the memory unit;
   determining a rate of accesses to the memory unit;
   updating an activity cache associated with an accumulator with access data corresponding to accesses to the memory unit;
   calculating a sample rate for sampling the access data in the activity cache based on the rate of access;
   responsive to an increase to the rate of accesses to the memory unit, decreasing the sample rate;
   sampling the access data from the activity cache based on the sample rate;
   scaling a value of the sampled access data to statistically represent accesses to the memory unit while accounting for discarded access data; and
   responsive to a level of access data in the activity cache reaching a threshold, storing the value of the sampled access data in the memory unit.

* * * * *